(12) United States Patent
Griffith et al.

(10) Patent No.: US 8,713,362 B2
(45) Date of Patent: Apr. 29, 2014

(54) OBVIATION OF RECOVERY OF DATA STORE CONSISTENCY FOR APPLICATION I/O ERRORS

(75) Inventors: Douglas J. Griffith, Austin, TX (US); Angela A. Jaehde, Austin, TX (US); Somasundaram Krishnasamy, Austin, TX (US); Stephen A. Schlachter, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 12/958,389

(22) Filed: Dec. 1, 2010

(65) Prior Publication Data

US 2012/0144233 A1  Jun. 7, 2012

(51) Int. Cl.
  *G06F 11/00*  (2006.01)
(52) U.S. Cl.
  USPC ............................................. 714/13
(58) Field of Classification Search
  USPC ............................................. 714/13
  See application file for complete search history.

(56) References Cited

U.S. PATENT DOCUMENTS

| | | | |
|---|---|---|---|
| 5,737,514 A | 4/1998 | Stiffler | |
| 5,845,082 A | 12/1998 | Murakami | |
| 5,907,673 A | 5/1999 | Hirayama et al. | |
| 5,951,695 A | 9/1999 | Kolovson | |
| 5,958,070 A | 9/1999 | Stiffler | |
| 6,332,200 B1 | 12/2001 | Meth et al. | |
| 6,401,216 B1 | 6/2002 | Meth et al. | |
| 6,477,663 B1 | 11/2002 | Laranjeira et al. | |
| 6,574,752 B1 * | 6/2003 | Ahrens et al. | 714/43 |
| 6,594,744 B1 * | 7/2003 | Humlicek et al. | 711/162 |
| 6,678,704 B1 | 1/2004 | Bridge, Jr. et al. | |
| 6,691,245 B1 * | 2/2004 | DeKoning | 714/6 |
| 6,728,960 B1 | 4/2004 | Loomans | |
| 6,802,021 B1 | 10/2004 | Cheng et al. | |
| 7,069,401 B1 | 6/2006 | Noonan et al. | |

(Continued)

FOREIGN PATENT DOCUMENTS

JP  11039178  2/1999

OTHER PUBLICATIONS

HP Partitioning Continuum for HP-UX11i on HP 9000 and HP Integrity servers, 2004, Retrieved from Internet:< URL: http://www.web.archive.org/web/20051227174158/http://h71028.www7.hp.com/ERC/downloads/5982-9141EN.pdf>, 33 pages.

(Continued)

*Primary Examiner* — Yair Leibovich
(74) *Attorney, Agent, or Firm* — Schmeiser, Olsen & Watts, LLP; Mark C. Vallone

(57) ABSTRACT

Embodiments comprise a plurality of computing devices that dynamically intercept process application I/O errors. Various embodiments comprise two or more computing devices, such as two or more servers, each having access to a shared data storage system. An application may be executing on the first computing device and performing an I/O operation when an I/O error occurs. The first computing device may intercept the I/O error, rather than passing it back to the application, and prevent the error from affecting the application. The first computing device may complete the I/O operation, and any other pending I/O operations not written to disk, via an alternate path, perform a checkpoint operation to capture the state of the set of processes associated with the application, and transfer the checkpoint image to the second computing device. The second computing device may resume operation of the application from the checkpoint image.

20 Claims, 5 Drawing Sheets

(56) References Cited

U.S. PATENT DOCUMENTS

| | | | |
|---|---|---|---|
| 7,114,096 B2 | 9/2006 | Freimuth et al. | |
| 7,127,561 B2 | 10/2006 | Hill et al. | |
| 7,185,226 B2 | 2/2007 | Chen et al. | |
| 7,236,987 B1 | 6/2007 | Faulkner et al. | |
| 7,363,474 B2 | 4/2008 | Rodgers et al. | |
| 7,529,816 B2 | 5/2009 | Hayden et al. | |
| 7,613,749 B2 | 11/2009 | Flynn, Jr. et al. | |
| 7,650,552 B2 | 1/2010 | Pourbigharaz et al. | |
| 7,653,833 B1 * | 1/2010 | Miller et al. | 714/13 |
| 7,669,081 B2 | 2/2010 | Lett et al. | |
| 7,779,295 B1 * | 8/2010 | Shah et al. | 714/6.32 |
| 8,127,174 B1 * | 2/2012 | Shah et al. | 714/13 |
| 8,141,053 B2 | 3/2012 | Levine | |
| 2003/0043736 A1 * | 3/2003 | Gonda | 370/218 |
| 2006/0020854 A1 * | 1/2006 | Cardona et al. | 714/13 |
| 2007/0250750 A1 | 10/2007 | Pourbigharaz et al. | |
| 2008/0034190 A1 | 2/2008 | Rodgers et al. | |
| 2009/0210751 A1 * | 8/2009 | Cabezas et al. | 714/43 |
| 2011/0208908 A1 | 8/2011 | Chou et al. | |
| 2012/0144232 A1 | 6/2012 | Griffith et al. | |
| 2012/0144233 A1 | 6/2012 | Griffith et al. | |

OTHER PUBLICATIONS

VMware High Availability, Concepts, Implementation, and Best Practices, Retrieved from Internet< URL: http://www.vmware.com/files/pdf/VMwareHA_twp.pdf>, White Paper, 29 pages.

VMware High Availability, Easily deliver high Availability for all of your virtual machines, Retrieved from Internet< URL: http://www.vmare.com/files/pdf/ha_datasheet.pdf>, 2 pages.

VMware Fault Tolerance Recommendations and Considerations on VMware vSphere 4, Retrieved from Internet< URL: http://www.vmware.com/files/pdf fault_tolerance_recommendations_considerations_on_vmw_vsphere4.pdf>, 16 pages.

Protecting Mission-Critical Workloads with VMware Fault Tolerance, Retrieved from Internet< URL: http://www.vmware.com/files/pdf/resources/ft_virtualization_wp.pdf>, 8 pages.

Patrizio et al., Get Connected, Architectures for High Availability and Disaster Tolerance with HP serviceguard, Retrieved from Internet< URL: http://www.hpcollateral.com/Files/EcoCollateral_20090616_2363_Gray-Patrizio_v5_handout1-15Jun09_syla.pdf> Jun. 17, 2009, 1 page.

Veritas™ Cluster Server User's Guide, Solaris, 5.0, symantec, www.symantec.com, 5 pages.

Read et al., Using Solaris™ Cluster And Sun™ Cluster Geographic Edition with Virtualization Technologies, Part No. 820-4690-10, Revision 1.0, Apr. 29, 2008, Sun Microsystems, 46 pages.

Burns et al., Fastpath Optimizations for Cluster Recovery in Shared-Disk Systems, Supercomputing 2004, 0-7695-2153-3/04 (c)2004 IEEE, 9 pages.

Nagarajan et al., Proactive Fault Tolerance for HPC with Xen Virtualization, ICS'07, Jun. 18-20, 2007, copyright 2007 ACM978-1-59593-768-01/07/0006, pp. 23-32.

Wang et al., Hadoop High Availability through Metadata Replication, CloudDB'09, Nov. 2, 2009, Copyright 2009 ACM 978-1-60558-802-5/09/11, pp. 37-44.

Zheng et al., Performance Evaluation of Automatic Checkpoint-based Fault Tolerance for AMPI and Charm++, pp. 90-99.

RCE filed Mar. 26, 2013 for U.S. Appl. No. 12/960,380, filed Dec. 3, 2010, First Named Inventor Griffith et al., Confirmation No. 7082.

Notice of Allowance (Mail Date Jan. 30, 2013) for U.S. Appl. No. 12/960,380, filed Dec. 3, 2010, First Named Inventor Griffith et al., Confirmation No. 7082.

Notice of Allowance for U.S. Appl. No. 12/960,380, filed Dec. 3, 2010, Confirmation No. 7082.

* cited by examiner

OBVIATION OF RECOVERY OF DATA STORE CONSISTENCY FOR APPLICATION I/O ERRORS

BACKGROUND

The present disclosure relates generally to computing and data storage devices. More particularly, the present disclosure relates to handling input/output (I/O) errors for applications in multiple computing device environments, such as in server cluster environments.

Common types of computing devices are desktop computers and server systems, with server systems frequently comprising high availability (HA) clusters. Such computers and servers may have both locally connected data storage devices and remotely connected data storage devices. For data storage, an increasingly common technology is referred to as storage area networking, or simply storage area network (SAN). SAN technology comprises connecting remote computer storage devices, such as disk arrays and optical storage arrays, to servers and other computing devices in such a way that the storage devices appear as locally attached storage to the computing devices and the operating systems that share the storage devices.

Certain aspects of technology for server and cluster infrastructures are well established. High availability clusters may be configured to monitor applications for failures and perform various types of recovery actions for the applications. Typically, a set of distributed daemons monitor cluster servers and associated network connections in order to coordinate the recovery actions when failures or errors are detected. The cluster infrastructure may monitor for a variety of failures that affect cluster resources. In response to a failure, the infrastructure may initiate various corrective actions to restore functionality of affected cluster resources, which may involve repairing a system resource, increasing or changing a capacity of a system resource, and restarting the application.

For some known systems, restarting an affected application may involve starting a backup copy of the application on a standby or takeover server. Restarting such applications often requires reconfiguring system resources on the takeover server and running various recovery operations, such as performing a file system check (fsck). Further, restarting applications generally requires that the applications perform necessary initialization routines. Even further, restarting the applications often requires additional application recovery operations when the data stores are not left in consistent states, such as replaying a journal log.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Some embodiments comprise a method that includes a computer intercepting an error of an input/output (I/O) operation of an application. The I/O operation may be using a first path to a shared storage system of data. While intercepting the error, the computer may prevent execution of code of the application in response to the error, as well as create a checkpoint of a set of processes which the application comprises. The method includes the computer completing the I/O operation via a second path to the shared storage. The checkpoint image enables resumption of execution of the application by starting execution at a point in the application subsequent to completion of the I/O operation. The method also includes the computer transferring the checkpoint image to a second computer to enable the second computer to resume execution of the application.

Further embodiments comprise apparatuses having I/O hardware coupled to a storage device. The I/O hardware may enable the apparatus to perform I/O operations for an application. An application module executes the application and generates state of a set of processes for the application. The application module performs an I/O operation for the application via a first path to data of the storage device. An error module to intercepts an error of the I/O operation and prevents the error from causing the application module to execute code in response to the error.

The application module completes the I/O operation via a second path to data of the storage device in response to the error module intercepting the error. A checkpoint module of the apparatus creates a checkpoint image of the state in response to completion of the I/O operation via the second path. The checkpoint module transfers the checkpoint image to a second apparatus. The checkpoint module creates the checkpoint image in a manner which enables the second apparatus to resume execution of the application by starting execution at a point in the application subsequent to the completion of the I/O operation.

Further embodiments comprise a server for processing an error of an I/O operation. The server has one or more processors, one or more computer-readable memories, and one or more computer-readable, tangible storage devices. The embodiments have program instructions, stored on at least one of the one or more storage devices for execution by at least one of the one or more processors via at least one of the one or more memories, to enable an application of the server to perform the I/O operation with a storage subsystem via a first storage connection. The application comprises a set of processes.

Further, the embodiments have program instructions to complete the I/O operation via a second storage connection and create a checkpoint image of the set upon the completion of the I/O operation. The checkpoint image enables resumption of execution of the application by starting execution at a point in the application subsequent to the completion of the I/O operation. The embodiments also have program instructions to transfer the checkpoint image to a second server to enable the second server to resume operation of the application, wherein the transference is via at least one of a shared memory connection and a network interface.

Further embodiments comprise a computer program product for handling an error of an I/O operation. The computer program product has one or more computer-readable, tangible storage devices. The computer program product also has program instructions, stored on at least one of the one or more storage devices, to intercept the error of the I/O operation of an application, wherein the I/O operation is via a first path from a first computing device to a shared storage system of data. The embodiments also have program instructions to complete the I/O operation via a second path to the shared storage system of data. Further, the embodiments also have program instructions to create a checkpoint image of the application, wherein the checkpoint image comprises state of the application. Even further, the embodiments also have program instructions to prevent the first computing device from executing code of the application in response to the error. The checkpoint image enables resuming execution of the application, which includes obviating initialization of the application. The embodiments also have program instructions to enable the generation of the checkpoint image in a second computing device.

BRIEF DESCRIPTION OF THE SEVERAL VIEWS OF THE DRAWINGS

Aspects of the various embodiments will become apparent upon reading the following detailed description and upon reference to the accompanying drawings in which like references may indicate similar elements.

DETAILED DESCRIPTION

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally speaking, methods, apparatuses, systems, and computer program products to dynamically intercept application I/O errors and resubmit the associated requests are contemplated. Various embodiments comprise two or more computing devices, such as two or more servers, each having access to locally connected data storage devices or access to a shared data storage system. An application may be running on one of the servers and performing I/O operations.

While performing an I/O operation, an I/O error may occur. The I/O error may be related to a hardware failure or a software failure. A first server of the two or more servers may be configured to intercept the I/O error, rather than passing it back to the application. In response to intercepting the I/O error, and preventing the error from affecting the application, the first server may quiesce the application and first attempt to remotely submit pending I/O operations. In response to completion of I/O operations, the first server may create a checkpoint image to capture a state of a set of processes associated with the application. In response to transferring the checkpoint image to a second server of the two or more servers, the second server may resume operation of the application.

As an alternative to remotely submitting the associated I/O request after intercepting the error, the first server may temporarily cache the I/O request locally. For example, the first server may have not found a path to the shared data storage system via remote nodes. The first server may keep the application on a local node in frozen state and just cache the failed I/O request in a file. The first server may then resume the application when the source of the error is corrected or, alternatively, create a checkpoint image and resume the application via the checkpoint image on another server.

By intercepting the I/O error in this manner, the first server may prevent the application from entering or executing code of an internal error path. Further, handling the failed I/O request in this manner may increase application availability and obviate or avoid the need for time-consuming recovery operations which may otherwise be required to restore consistency of data stores, such as restoring the consistency of a database associated with the application.

Figure 1:
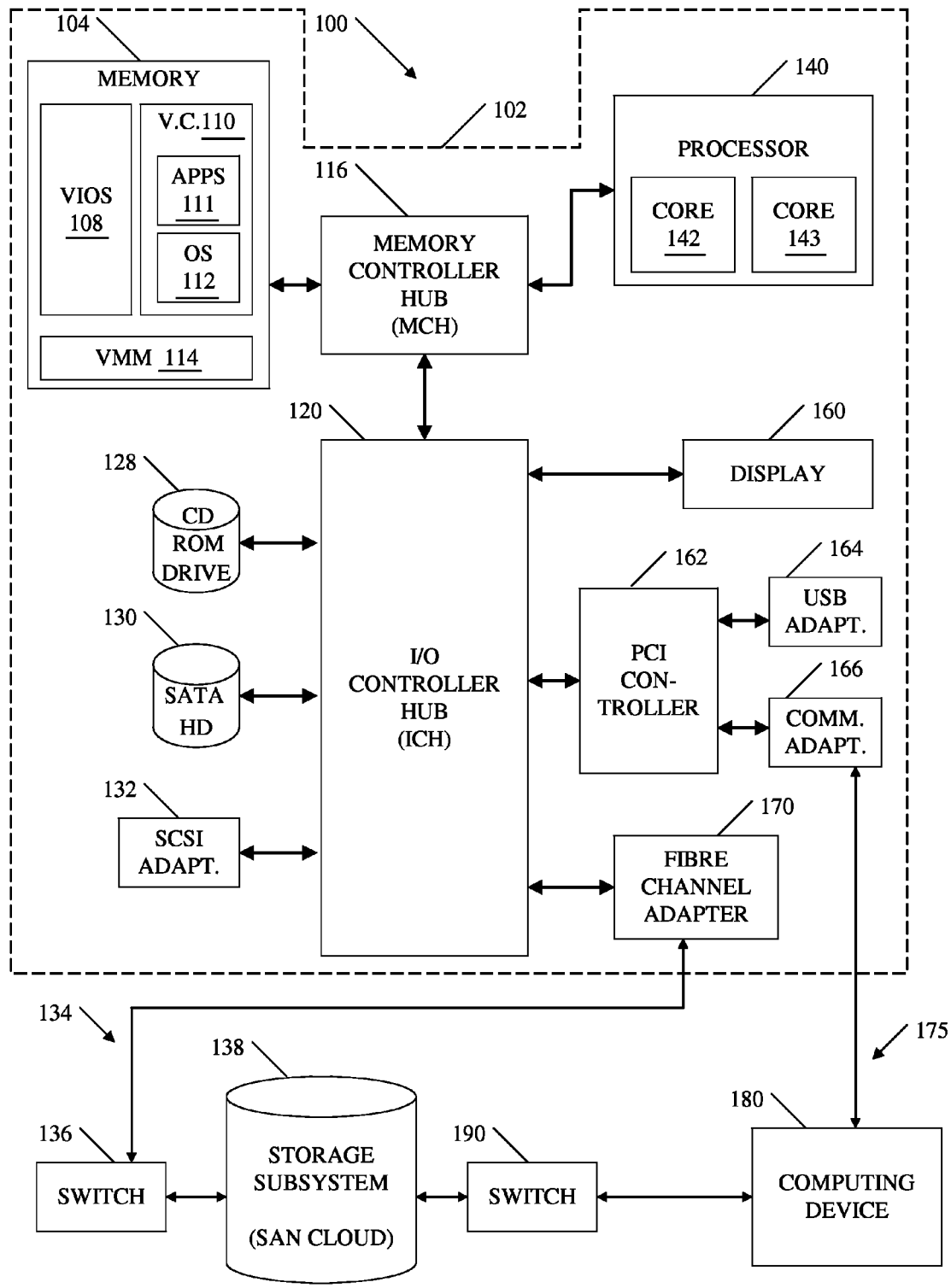
FIG. 1 depicts an illustrative embodiment of a system that may handle I/O errors for applications in multiple computing device environments.

Turning now to the drawings, FIG. 1 depicts an illustrative embodiment of system 100 that may handle I/O errors for applications in multiple computing device environments. FIG. 1 depicts computing device 102 with processor 140, memory controller hub (MCH) 116, memory 104, and I/O controller hub (ICH) 120. In numerous embodiments computing device 102 may comprise a server, such as a server in a HA cluster. In other embodiments, computing device 102 may comprise a different type of computing device, such as a mainframe computer or part of a mainframe computer system, a desktop server computer in an office environment, or an industrial computer in an industrial network, such as a computer in a distributed control system (DCS) system. Numerous configurations are possible, consistent with the following discussion and appended claims.

Processor 140 may have a number of cores, such as cores 142 and 143, which may be coupled with cache memory elements. For example, processor 140 may have cores 142 and 143 coupled with internal processor cache memory. The number of processors and the number of cores may vary from embodiment and embodiment. For example, while system 100 has one processor 140, alternative embodiments may have other numbers of processors, such as two, four, eight, or some other number. The number of cores of a processor may also vary in different embodiments, such as one core, four cores, five cores, or some other number of cores.

As depicted in FIG. 1, computing device 102 may execute a number of applications, such as applications 111, using an operating system 112, and one or more virtual clients of memory 104, such as virtual client 110. For example, computing device 102 may comprise part of a larger server system, such as a computing board, or blade server, in a rack-mount server. Processor 140 may execute program instructions for programs and applications 111. Applications 111 may comprise, e.g., a network mail program and several productivity applications, such as a word processing application, one or more database applications, and a business intelligence application. During execution, one or more of applications 111 may perform various I/O operations.

Processor 140 may execute the instructions in memory 104 by interacting with MCH 116. The types of memory devices comprising memory 104 may vary in different embodiments. In some embodiments, memory 104 may comprise volatile memory elements, such as four 4-gigabyte (GB) dynamic random access memory (DRAM) sticks. Some embodiments may comprise smaller or larger amounts of memory. For example, some embodiments may comprise 128 GB of RAM, while other embodiments may comprise even more memory, such as 512 GB. In alternative embodiments, memory 104 may comprise nonvolatile memory. For example in some embodiments memory 104 may comprise a flash memory module, such as a 64 GB flash memory module.

Also as depicted in FIG. 1, computing device 102 may have virtual machine monitor 114, such as a hypervisor, that manages one or more virtual machines, such as virtual client 110 and virtual I/O server 108. In other words, virtual machine monitor 114 may allow multiple operating systems to execute simultaneously. In the embodiment of FIG. 1, virtual machine monitor 114 may comprise an application loaded into memory 104, separate from any operating system. Virtual machine monitor 114 may provide an abstraction layer between physical hardware resources of computing device 102 and logical partitions of computing device 102, wherein virtual client 110 may reside in one of the logical partitions. Virtual machine monitor 114 may control the dispatch of virtual processors to physical processor 140, save/restore processor state information during virtual processor context switches, and control hardware I/O interrupts and management facilities for partitions.

In different embodiments, virtual machine monitor 114 may exist in different forms. For example, in one embodiment virtual machine monitor 114 may comprise firmware coupled to processor 140. In another embodiment, virtual machine monitor 114 may comprise a software application loaded as part of or after operating system 112. That is to say, virtual machine monitor 114 may comprise an application being executed by operating system 112. Some embodiments may have no separate virtual machine monitor, in which case operating system 112 may perform the functions of virtual machine monitor 114. The number of virtual machines may also vary from embodiment to embodiment. Alternatively, some embodiments may not employ virtual machine monitor 114.

Virtual client 110 and virtual I/O server 108 may each comprise collections of software programs that form self-contained operating environments. Virtual client 110 and virtual I/O server 108 may operate independently of, but in conjunction with, virtual machine monitor 114. For example, virtual I/O server 108 may work in conjunction with virtual machine monitor 114 to allow virtual client 110 and other virtual clients to interact with various physical I/O hardware elements. For example, an application of applications 111 may periodically write data to storage subsystem 138.

ICH 120 may allow processor 140 to interact with external peripheral devices, such as keyboards, scanners, and data storage devices. Programs and applications being executed by processor may interact with the external peripheral devices. For example, processor 140 may present information to a user via display 160 coupled to, e.g., an Advanced Graphics Port (AGP) video card. The type of console or display device of display 160 may be a liquid crystal display (LCD) screen or a thin-film transistor flat panel monitor, as examples.

Display 160 may allow a user to view and interact with applications 111. For example, display 160 may allow the user to execute a database application of applications 111 and store database records to a storage area network coupled to computing device 102 via I/O hardware, such as a fibre channel adapter 170. Alternative embodiments of computing device 102 may comprise numerous I/O hardware components, such as numerous fibre channel adapters 170. Additionally, in some embodiments, the user or a system administrator may also use display 160 to view and change configuration information of virtual machine monitor 114, virtual I/O server 108, and virtual client 110. For example, the system administrator may configure how computing device 102 should respond to an I/O error, such as attempting to establish a remote path to storage subsystem 138, or by immediately relocating the application to another computing device, with an alternate path to storage subsystem 138, and resuming execution.

As briefly alluded to for numerous embodiments, ICH 120 may enable processor 140 and one or more applications of applications 111 to locally store data to and retrieve data from various data storage devices. For example in one embodiment, computing device 102 may allow applications 111 to store data to storage subsystem 138 via local path 134 comprising SAN switch 136 coupled to fibre channel adapter 170. Virtual client 110 may be configured to have a dedicated storage device attached to fibre channel adapter 170. In the event of an I/O error, such as the failure of SAN switch 136, virtual client 110 may nonetheless store and/or retrieve information remotely via virtual I/O server 108, virtual machine monitor 114, and an alternate storage device, such as SAN switch 190, by way of alternate computing device 180.

In alternative embodiments, ICH 120 may enable applications 111 to locally store and retrieve data from one or more universal serial bus (USB) devices via Peripheral Component Interconnect (PCI) controller 162 and a USB device coupled to USB adapter 164. In an embodiment, virtual client 110 may be configured to store and/or retrieve information via virtual I/O server 108, virtual machine monitor 114, and a primary USB hard drive coupled with USB adapter 164. In the event of a failure of an element of the primary USB hard drive, virtual client 110 may nonetheless store and/or retrieve information via a dedicated secondary USB hard drive, attached to USB adapter 164 or a secondary USB adapter.

Computing device 102 may also send and receive data via PCI controller 162 and communication adapter 166. Communication adapter 166 may comprise, e.g., a network interface card (NIC). In an example failover scenario, local path 134 may be affected by an I/O error associated with fibre channel adapter 170. Computing device 102 may quiesce one or more applications of applications 111 and temporarily establish remote path 175 to store data to storage subsystem 138 via PCI controller 162, communication adapter 166, computing device 180, and SAN switch 190. In other words, computing device 102 may complete the pending I/O operation(s) via remote path 175.

In several embodiments, a local path to data storage or more simply local storage may refer to storage devices coupled directly to a computing device, without an intervening computing device. Conversely, a remote path or remote storage may refer to a storage device coupled indirectly to a computing device, wherein the computing device relies on an intervening computing device for access to the storage device, such as an intervening server. In FIG. 1, local path 134 does not comprise an intervening computing device, while remote path 175 comprises computing device 180.

Upon repair and recovery of the problem which led to the I/O error, the computing device may automatically reestablish the local path 134 to storage subsystem 138, abandoning the remote connection established through computing device 180. Alternatively, if local path 134 is affected for an unacceptable amount of time, the computing device may create checkpoint images of the applications in order to relocate and resume the applications via one or more other servers.

In another alternative embodiment, system 100 may allow applications 111 to transfer data between virtual client 110 and a hard disk of an Internet Small Computer Systems Interface (iSCSI) SAN. For example, an embodiment may employ an iSCSI SAN in lieu of, or in addition to, fibre channel adapter 170. Computing device 102 may have several virtual clients situated in one or more logical partitions (LPARs). Virtual client 110 may reside in one logical partition and virtual I/O server 108 may reside in a second logical partition. Computing device 102 may enable virtual client 110 to communicate with and transfer information to/from a primary iSCSI hard disk using communication adapter 166 via an associated NIC. The embodiment may allow virtual client 110 to transfer information to/from a secondary iSCSI hard disk using a secondary communication adapter and a secondary NIC coupled to virtual I/O server 108, in the event of an I/O error associated with the primary iSCSI hard disk or an interconnecting network device between the iSCSI hard disk and communication adapter 166.

Alternative embodiments may employ different technologies for communication adapter 166 differently. For example one embodiment may utilize a virtual fiber-optic bus while another embodiment may employ a high-speed link (HSL) optical connection for communication adapter 166.

In addition to USB adapter 164 and communication adapter 166, ICH 120 may also enable applications 111 to locally store/retrieve data by way of Advanced Technology Attachment (ATA) devices, such as ATA hard drives, digital versatile disc (DVD) drives, and compact disc (CD) drives, like CD read only memory (ROM) drive 128. As shown in FIG. 1, computing device 102 may have a Serial ATA (SATA) drive, such as SATA hard drive 130. SATA hard drive 130 may be used, e.g., to locally store database information for a database application, numerous operating systems for various partitions, device drivers, and application software for virtual clients of system 100. For example, SATA hard drive 130 may store IBM® AIX®, Linux®, Macintosh® OS X, Windows®, or some other operating system that the computing device loads into one or more LPARs and/or workload partitions. IBM® and AIX® are registered trademarks of International Business Machines Corporation in the United States, other Countries, or both. Linux is a registered trademark of Linus Torvalds in the United States, other countries or both. Macintosh is a trademark or registered trademark of Apple, Inc. in the United States, other countries, or both. Windows is a trademark of Microsoft Corporation in the United States, other countries, or both. Instead of SATA hard drive 130, computing device 102 in an alternative embodiment may comprise a SCSI hard drive coupled to SCSI adapter 132 for internal storage.

Alternative embodiments may also dynamically handle I/O errors associated with physical and virtual multi-path I/O for a computing device having different types of hardware not depicted in FIG. 1, such as a sound card, a scanner, and a printer, as examples. For example, the computing device may be in the process of transferring data from a scanner and storing the data to storage subsystem 138 via SAN switch 136 and fibre channel 170. The computing device may encounter a problem with the SAN switch, and enable failover, via virtual I/O server 108, to SAN switch 190 by way of computing device 180. Conversely, in different embodiments, system 100 may not comprise all of the elements illustrated for the embodiment shown in FIG. 1. For example, some embodiments of system 100 may not comprise one or more of SCSI adapter 132, PCI controller 162, USB adapter 164, or CD-ROM drive 128.

Figure 2:
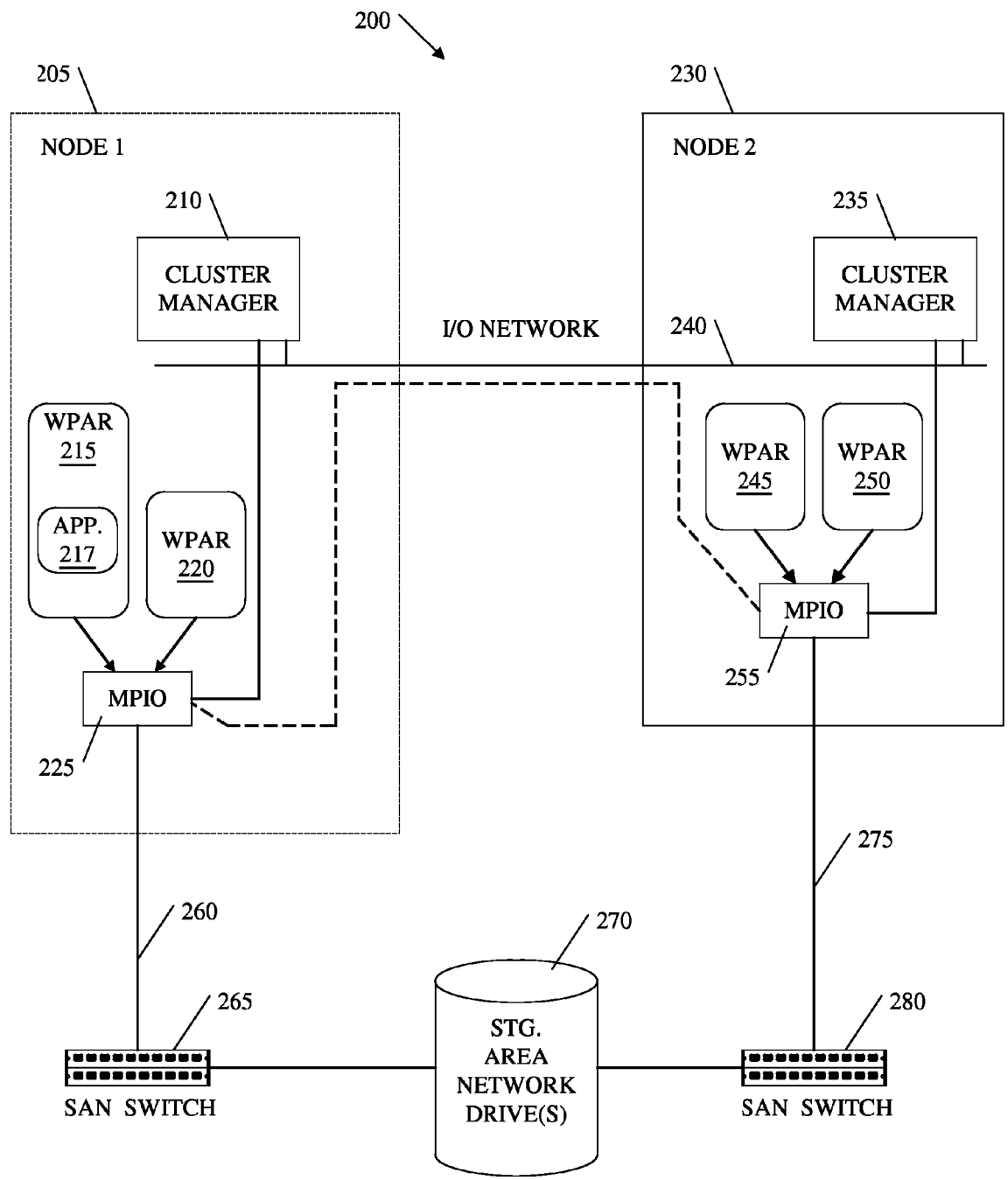
FIG. 2 illustrates how an illustrative embodiment of a system with first and second nodes that may handle I/O errors for an application of the first node.

To provide a more detailed illustration of how a system may handle I/O errors for applications in multiple computing device environments, we turn now to FIG. 2. FIG. 2 illustrates how an illustrative embodiment of a system 200 with first and second nodes (205 and 230) may handle I/O errors for an application of the first node 205. For example, first node 205 may correspond to computing device 102, while second node 230 may correspond to computing device 180. Each of node 205 and node 230 may comprise, as another example, an individual server. Workload partitions (WPARs) 215 and 220 may comprise elements in a virtual machine environment of an apparatus or a computing device, such as one of computing device 102 or computing device 180 in FIG. 1.

System 200 may implement a cluster infrastructure that provides management of distributed MPIO (multipath input/output) servers, performing configuration consistency checks and integrating the function into coordinated recovery of cluster resources. Further, system 200 may implement a set of user-configurable policies to schedule relocation of a resource group in response to a failure of all local paths of an MPIO device, such as a failure of a network router, switch, or a network interface card. A resource group may comprise a set of one or more applications and supporting system resources.

As FIG. 2 further illustrates, each node or resource group may comprise one or more WPARs. Node 205 comprises WPARs 215 and 220, while node 230 comprises WPARs 245 and 250. Depending on the embodiment, a WPAR may comprise a software partitioning element which may be provided by the operating system. A WPAR may comprise another layer of abstraction, wherein each WPAR provides isolation from the hardware and removes software dependencies on hardware features.

One or more WPARs in FIG. 2 may host applications and isolate them from other applications executing within other WPARs. For example, WPAR 215 may comprise a database application which executes independently to, and separately from, a business intelligence application executing within WPAR 220.

In FIG. 2, an application running in one of WPARs 215 and 220 of node 205 may encounter an I/O error due to a failure of hardware within node 205 or external to node 205, such as a failure of SAN switch 265. Typically, the cluster of devices associated with node 205 would perform numerous cluster-to-cluster recovery actions using an intra-server protocol. First, hardware of node 205 may detect the failure, in this example loss of data storage because of loss of access to SAN 270.

Node 205, via cluster manager 210, may shut down the applications of WPARs 215 and 220, which may involve a disorderly shutdown of one or more of the applications, because of forced termination of processes accessing the failed I/O device, SAN switch 265. Cluster manager 210 may also de-configure system resources for the affected resource group(s) of node 205. For example, cluster manager 210 may un-mount all file systems of SAN 270 mounted via SAN switch 265 and vary the size of numerous off-volume groups.

Cluster manager 210 may poll the states of resources on potential servers, such as the states of resources on node 230 and other nodes (not shown in FIG. 2) to which node 205 may be connected via network 240. Cluster manager 210 may work in conjunction with the cluster managers of the other nodes and elect a takeover server based on availability of hardware and spare capacity. For example, node 230 may be elected the takeover server based on spare capacity of WPAR 250 and access, via SAN switch 280, to database records on SAN 270 for the affected application.

Of the various recovery actions performed by nodes 205 and 230 using only known technology, the largest contributors to takeover time are usually reconfiguring system resources, performing recovery operations like fsck, and restarting applications. An embodiment may significantly reduce the time to recover from an I/O error by working to prevent, or at least reduce, the number of recovery actions involved in transferring the applications to the takeover server.

An embodiment of system 200 may handle an I/O error for application 217 of node 205 by intercepting the I/O error rather than passing the error back to application 217. Intercepting the error in such a fashion may prevent data inconsistencies, such as for a database record associated with application 217. The embodiment of system 200 may then remotely submit the failed I/O request or even cache it locally, which may prevent the application from entering an internal error path and subsequently eliminate or reduce the time required for data store recovery operations.

Additionally, the embodiment may create a checkpoint image for application 217 and transfer the image to node 230 for resumption of execution. For example, system 200 may implement a method to freeze execution of a given set of processes of application 217 that encounters an I/O error and generate a checkpoint image in response to the error. In particular, if an error for a device is detected, system 200 may generate a checkpoint of the set of processes and shared IPC resources. What constitutes a checkpoint image may vary depending on the embodiment. For many embodiments, a checkpoint image may generally comprise a core image of a set of processes in memory, as well as the related kernel data structures, such that the set of processes can be reconstituted from the checkpoint image and resumed. For the purpose of illustration by analogy, the checkpoint image may be similar to the state information that a laptop saves to the hard drive for applications and the operating system when entering hibernation. How embodiments may be configured to perform these actions will now be examined in more detail.

As FIG. 2 illustrates, nodes 205 and 230 may be communicably coupled together via network 240. Node 204 may comprise a blade server in a rack of servers in one room of a building, while node 230 may comprise another server in a different rack in another room. The location of the individual nodes in a system may vary from embodiment to embodiment. In some embodiments, both nodes may be located together, such as in the same rack or room or in the same room. Alternatively, in other embodiments, the nodes may be geographically separated, separated by thousands of miles, wherein network 240 may comprise a virtual private network (VPN) connection. In further alternative embodiments, nodes 204 and 230 may each comprise individual partitions in a virtual machine environment. For example, node 205 may comprise a first logical partition (LPAR), while node 230 comprises a second LPAR. The partitions may reside on the same server or on separate servers. In various embodiments, an LPAR may refer to a logical grouping, or partitioning, of microprocessor resources, memory resources, and I/O resources. For example, when an embodiment is in a virtual computing environment, a node may comprise multiple LPARs, with each LPAR operating a different operating system. Alternatively, the node may have one LPAR running multiple instances of different operating systems via individual workload partitions. In other words, an embodiment may employ virtual computing to operate multiple instances of operating systems on a single computing device, such as a single motherboard of a server.

In various embodiments, applications may require supporting system resources, such as memory, processors or portions of processing power, storage, and Internet protocol (IP) addresses. Each of nodes 205 and 230 may enable virtualization and division of the computing hardware, such as the processor(s), portions or sections of the data storage device(s), and the communication adapter(s).

To illustrate in more detail, node 205 may comprise an AIX® client while node 230 may comprise a Linux® client, each of nodes 205 and 230 comprising a separate logical partition. Node 205 may reside on one server, along with three or more other LPARs, sharing one processor, one local storage device, and one communication adapter. While not shown, a virtual machine monitor may enforce partition security for node 205 and provide inter-partition communication that enables the virtual storage and virtual Ethernet functionality, such as a virtual Ethernet which employs network 240. Again, this is only one example, and different embodiments will comprise different configurations.

Each node may have a cluster manager. Cluster manager 210 and cluster manager 235 may each comprise management modules to execute various programs, or daemons, which manage various tasks for nodes 205 and 230, respectively, and the respective virtual environments. Each management module may comprise a set of distributed daemons that provide various cluster services, such as reliable messaging, membership, synchronization between servers, and implementation of protocols for message and data transfer via the aforementioned types of server-to-server connections. For example, in one embodiment of FIG. 2, cluster manager 210 and cluster manager 235 may each run instances of the clstmgr, clinfo, and clsmuxpd daemons. Other embodiments may have run different daemons.

Each of nodes 205 and 230 in the embodiment shown in FIG. 2 has an MPIO module. The MPIO module may enable applications to perform I/O operations, transferring data between the application and storage devices or other network devices. Node 205 comprises MPIO module 225, while node 230 comprises MPIO module 255. MPIO modules 225 and 255 may comprise a distributed MPIO subsystem that accesses a shared storage subsystem, SAN 270. MPIO modules 225 and 255 are connected via a shared network, network 240. The actions of MPIO modules 225 and 255 may be coordinated in a distributed manner. If an I/O request has failed on all local paths, the request may be queued for submission on the MPIO device on the corresponding remote server, trying all remote devices until the I/O request has been completed successfully or all devices have been tried.

The form of an MPIO module and embodiment may vary, such as comprising only software, only hardware, or a combination of both hardware and software. In many embodiments, an MPIO module may comprise a device driver which may be either integrated into the kernel of the operating system, or alternatively, accessed by the kernel. In alternative embodiments, an MPIO module may comprise hardware elements in addition to software, such as firmware and communication hardware. For example, an MPIO module in one embodiment may comprise communication routines stored in nonvolatile memory of network interface card, as well as communication routines stored in nonvolatile memory of a SCSI card coupled to a local SCSI hard drive.

In the embodiment of FIG. 2, MPIO module 225 and MPIO module 255 may each provide an I/O control interface, submit I/O requests to local storage, and write I/O requests in a suitable format to a local cache when both local and remote storage access are unavailable. For example, node 205 may cache any pending I/O requests that failed due to an I/O error, as well as any I/O requests that may have been subsequently submitted, until node 205 quiesces application 217. An I/O control (ioctl) interface may perform or enable one or more of the following: receiving notification about a set of WPARs for which the I/O control interface is configured to monitor I/O elements, querying elements for I/O errors of the WPARs, setting and terminating remote paths, and querying for status of paths to local storage.

MPIO module 225 and MPIO module 255 may each submit I/O requests to local storage. For example, MPIO module 225 may submit I/O requests to SAN switch 265 and SAN 270 via a local path comprising communication link 260. MPIO module 255 may submit I/O requests to SAN switch 280 and SAN 270 via a local path comprising communication link 275. In submitting I/O requests to paths of local storage, an MPIO module may perform load balancing.

During execution of an application in WPAR 220, MPIO module 225 may submit a local I/O request via link 260. During performance of the associated I/O transfer, an error may occur. MPIO module 225 may detect this error and attempt to submit or complete the request using an alternate local path (not shown). If the error causes failure to all local paths, MPIO module 225 may communicate the error to cluster manager 210.

Cluster manager 210 may determine if the I/O request originated from a WPAR which was one of a set of WPARs for which cluster manager 210 has been configured or specified to monitor for I/O errors. If so, cluster manager 210 may instruct MPIO module 225 to buffer the I/O request until a remote MPIO device has been selected by the cluster subsystem. For example, MPIO module 225 may buffer the I/O request until cluster manager 210 selects MPIO module 255 to complete the I/O request via network 240, link 275, and SAN switch 280. Alternatively, if cluster manager 210 has been configured to automatically select MPIO module 225 as the initial remote MPIO device, cluster manager 210 may enqueue MPIO module 225 for transfer.

In many embodiments, MPIO module 225 may continue processing the incoming requests and allow for out-of order processing of I/O requests that originate from different WPARs, but preserve the order of I/O requests within the WPAR. For example, MPIO module 225 may preserve the order of I/O requests which originate from WPAR 215 and separately preserve the order of I/O requests which originate from WPAR 220. Further, if cluster manager 210 is not able to establish a remote path to SAN 270, such as when one or more of the elements of node 230 is offline, cluster manager 210 may immediately halt the execution of application 217 and other applications in WPARs 215 and 220, enabling MPIO module to write I/O requests in a suitable format to a local cache, preserving their order.

Processing I/O requests of applications of node 205 via network 240, link 275, and SAN switch 280 may introduce significant latencies. For many applications, the latencies may be minor and may not affect performance of the applications. However some applications may not be able to tolerate data storage or retrieval latencies. Accordingly, cluster manager 210 may halt execution of the applications that cannot tolerate the latencies.

Cluster manager 210 may instruct the operating systems of the WPARs to prepare the applications for relocation to another node, such as by ceasing different processing threads and bringing the states of the various processes that comprise the different applications to a consistent and context-switchable condition. In other words, cluster manager 210 may prepare the applications for creation of the checkpoint images. Cluster manager 210 may instruct the operating systems to create checkpoint images of a set of identified WPARs, such as each of the WPARs affected by I/O errors, and copy or move the checkpoint images from node 205 to node 230. After completion of checkpoint transfer, cluster manager 235 may instruct the operating systems to resume the applications of the WPARs.

The cluster infrastructure of FIG. 2, which includes cluster manager 210 and cluster manager 235, may perform polling and global maintenance of states of MPIO devices. For example, MPIO devices may comprise the state of one of the network interface cards associated with MPIO 225. The cluster infrastructure may further select the remote device for the forwarded I/O, such as MPIO 255 and the associated hardware for link 275 in order to establish a remote path to SAN 270 upon an error in link 260.

The cluster infrastructure may also implement a protocol to coordinate connection establishment between local and remote instances of the subsystem and involved MPIO devices at the endpoints. Further, the cluster infrastructure may determine the route for the remote paths and monitor the connection(s) of the remote path once established, such as monitoring network 240 when transferring data transfer between nodes 205 and 230. Even further, the cluster infrastructure may provide reliable transfer of I/O buffers, preserving the order of buffer data submitted between MPIO devices.

Figure 3:
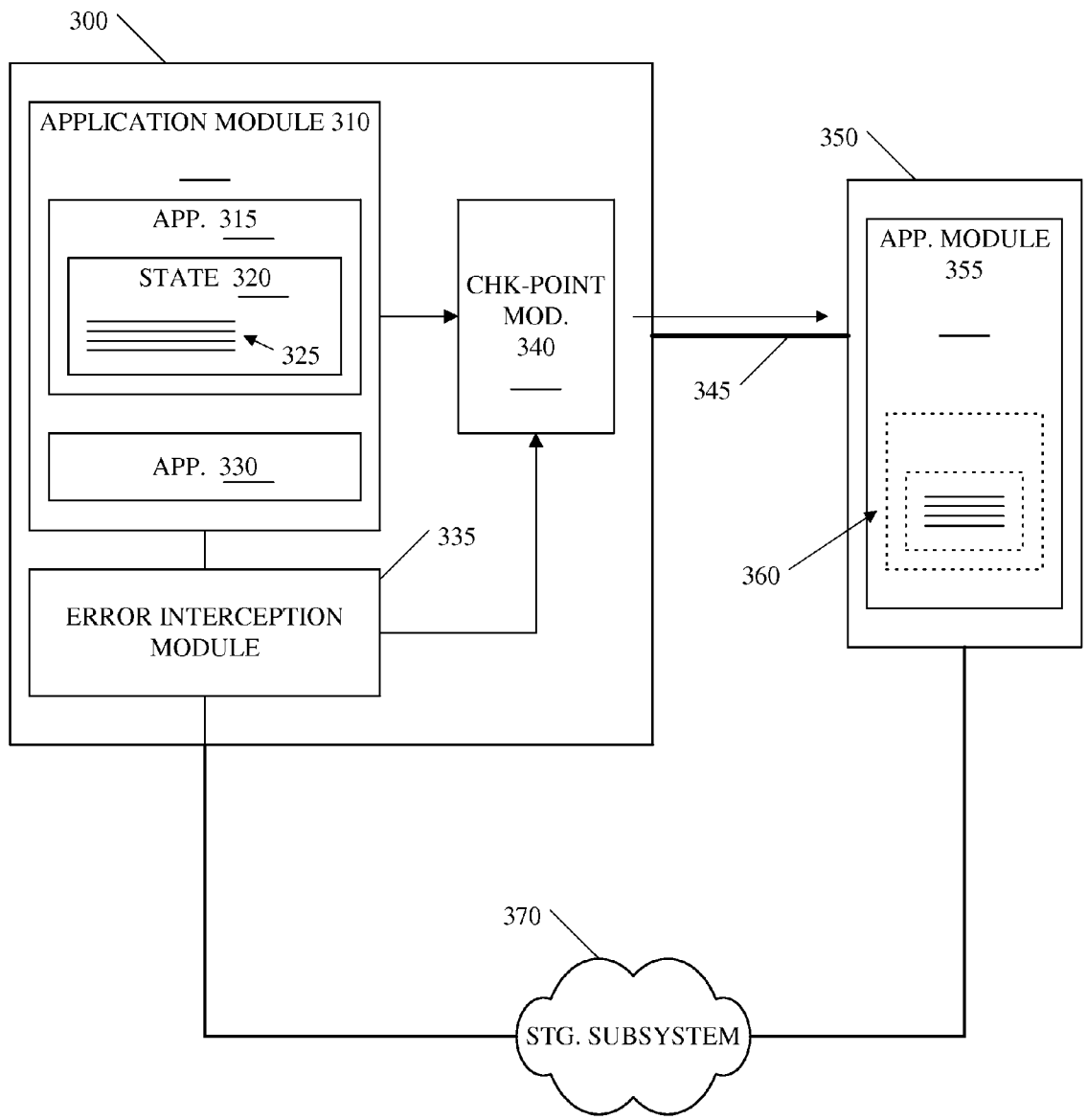
FIG. 3 illustrates in more detail how an illustrative embodiment may handle I/O errors for an application of a first apparatus by creating and transferring a checkpoint image of application state to a second apparatus.

FIG. 3 illustrates in more detail how an illustrative embodiment may handle I/O errors for an application 315 of a first apparatus 300 by creating and transferring a checkpoint image 360 of application state 320 to a second apparatus 350. For example, apparatus 300 or apparatus 350 may comprise a server, an LPAR, or other type of computing device in a multiple-computing device setting, such as computing devices 102 and 180 in FIG. 1.

One or more elements of apparatuses 300 and 350 may be in the form of hardware, software, or a combination of both hardware and software. For example, in the embodiment depicted in FIG. 3, error interception module 335 and checkpoint module 340 may comprise software code of an operating system, such as individual kernel modules, executed by one or more processors. In alternative embodiments, one or more of error interception module 335 and checkpoint module 340 of apparatus 300 may comprise hardware-only modules. For example, error interception module 335 may comprise a portion of an integrated circuit chip coupled with processors for a dedicated hardware partition of a computing device, which may comprise a different arrangement than the one shown in FIG. 3. In such embodiments, error interception module 335 may work in conjunction with application module 310, enabling applications to access I/O devices, such as physical host bus adapters (HBAs) and NICs which may process I/O requests for local and remote storage devices.

In even further alternative embodiments, one or more of error interception module 335 and checkpoint module 340 of apparatus 300 may comprise a combination of hardware and software modules. For example, checkpoint module 340 may comprise firmware and standalone processing circuitry that takes a snapshot of memory and the state of processors for applications 315 and 330, and subsequently communicates the checkpoint image to apparatus 350 via link 345.

In the embodiment depicted in FIG. 3, error interception module 335 may detect an I/O error issued by application 315 using one or more local paths to a shared data storage subsystem 370. For example, application 315 may comprise a database application which has requested to output/store data to storage subsystem 370. Error interception module 335 may monitor the I/O requests to storage subsystem 370 by applications 315 and 330 for errors. While the storage subsystem may vary with different embodiments, in the embodiment of FIG. 3, storage subsystem 370 may comprise a SAN with multiple RAID storage systems.

In one or more embodiments, error interception module 335 may intercept I/O errors in the kernel and enable apparatus 300 to complete the associated I/O requests remotely, such as by sending the I/O requests to a remote node by means of a distributed MPIO device. Continuing with the previous example, in response to detecting the error associated with the attempted I/O write of the database data, error interception module 335 may enable apparatus 300 to complete the I/O requests, enable application module 310 to halt application 315, and cause checkpoint module 340 to create a checkpoint image of application 315. In creating the checkpoint image, checkpoint module 340 may save state information suited for restoring application 315 to a state from which execution may be resumed.

Application 315 may comprise state 320, which may enable restoration of application 315. For example, state 320 may comprise a set of processes 325 that constitute application 315, as application module 310 executes code of application 315. At a high level of abstraction, a program or application my comprise instructions when first written by a programmer. Code may comprise an alternate form of the written instructions and data that represent the program after compilation. In one or more embodiments, code may be interpreted to mean executable code or machine code, such as representing the form of the program that a computing device executes during operation.

In response to error interception module 335 preventing the I/O error from being passed back to application 315, state 320 may be determined or obtained at a point in time when the I/O error has not affected application 315. In other words, checkpoint module 340 may create a checkpoint image, saving an entire program image of application 315 by using state 320, wherein state 320 reflects application runtime when no process of the set of processes 325 has entered a code path in response to the I/O error. However, the program image may reflect a point in runtime after the I/O operation associated with the error has been completed, such as by way of a remote path. For example, application module 310 may enable application 315 to complete the I/O operation via link 345, apparatus 350, and a communication link between apparatus 350 and a storage subsystem shared by apparatuses 300 and 350.

By creating a checkpoint image of application 315, checkpoint module 340 may relocate application 315 in response to the local I/O error of apparatus 300. Checkpoint module 340 may create the checkpoint image 360 in application module 355 by transferring the image via link 345. Link 345 may comprise, e.g., a network connection or a shared memory connection.

Once the checkpoint image 360 has been generated within application module 355, apparatus 350 may resume execution of application 315. For example, application module 355 may start executing code of application 315 at a point after the error was encountered and after the pending I/O requests were completed remotely, instead of starting the application anew. In some embodiments, application module 355 may have access to the original storage device of storage subsystem 370 which apparatus 300 accessed. Alternatively, in some embodiments or operating scenarios, apparatus 350 may resume execution of application 315 via access to a mirror copy of the data. In other words, an embodiment may comprise clusters with geographically mirrored storage.

Generating checkpoint image 360, which again is based on state 320 of the set of processes 325 before being altered by pass-back of the I/O error to application 315, yields a checkpoint of the set of processes that constitute application 315 which may be resumed on apparatus 350 without the need of data store recovery. In other words, application module 355 may resume execution of application 315 in an almost seamless manner. Contrastingly, if the I/O error were not intercepted and passed back to application 315, restoration of consistency the associated data stores may have been necessary. As one may observe, avoiding pass-back of I/O errors to the applications may yield dramatic improvements of takeover times by obviating recovery of the data stores.

In some situations, apparatus 300 may refrain from immediately relocating application 315 to apparatus 350. For example, before relocating application 315, apparatus 300 may determine that no apparatuses have access to the data of storage subsystem 370. If access to storage subsystem 370 has been lost globally, apparatus 300 may freeze execution of application 315 and provide local caching of incomplete or failed I/O until the access to storage subsystem 370 has been restored. Freezing execution and locally caching failed I/O requests may also avoid execution of error code paths and obviate restoration or recovery of data store consistency.

Further, execution of application 315 may be frozen temporarily, until apparatus 350 establishes access to storage subsystem 370. In response to recognizing the availability of the remote path and continued unavailability of the local path, apparatus 300 may submit the I/O requests via apparatus 350 without immediately relocating application 315. Parameters for a decision when to relocate may include performance characteristics of servers, devices, and network connections involved into the I/O path, and compliance with Service Level Agreements (SLAs).

Storage subsystem 370 may comprise numerous networking devices and one or more storage devices. For example, storage subsystem 370 may comprise an arrangement of routers, hubs, switches, and cabling, interconnecting a number of iSCSI disks, iSCSI tape drives, iSCSI optical storage devices, fibre channel RAID, fibre channel disks, fibre channel tape drives, fibre channel optical drives, and/or iSCSI RAID storage, as just a few examples. Storage subsystem 370 may attach and represent the storage devices in such a manner to make the storage devices appear as locally attached to each of apparatus 300 and apparatus 350. Storage subsystem 370 may use one or more low-level protocols for communications between servers and storage devices of storage subsystem 370. For example, different embodiments may use such protocols as ATA over ethernet, FICON mapping over fibre channel, fibre channel over Ethernet, HyperSCSI, ISCSI Extensions for RDMA (iSER), iFCP, and/or iSCSI.

The number of modules in an embodiment of apparatus 300 may vary. Some embodiments may have fewer modules than those module depicted in FIG. 3. For example, one embodiment may integrate the functions described and/or performed by error interception module 335 with the functions of checkpoint module 340 into a single module. That is to say, an alternative embodiment may have a single module capable of intercepting I/O errors and creating a checkpoint image in response.

Further embodiments may include more modules or elements than the ones shown in FIG. 3. For example, alternative embodiments may include one or more MPIO modules, two or more application modules, and additional takeover apparatuses which apparatus 300 may select. Even further, in some alternative embodiments, error interception module 335 and checkpoint module 340 may comprise numerous modules which may or may not be in the same physical device. For example error interception module 335 and checkpoint module 340 may be spread among multiple servers in a server system, such as existing in multiple client management modules of servers in a cluster. Several servers of the system may comprise one or more virtual clients and/or virtual I/O servers.

Figure 4:
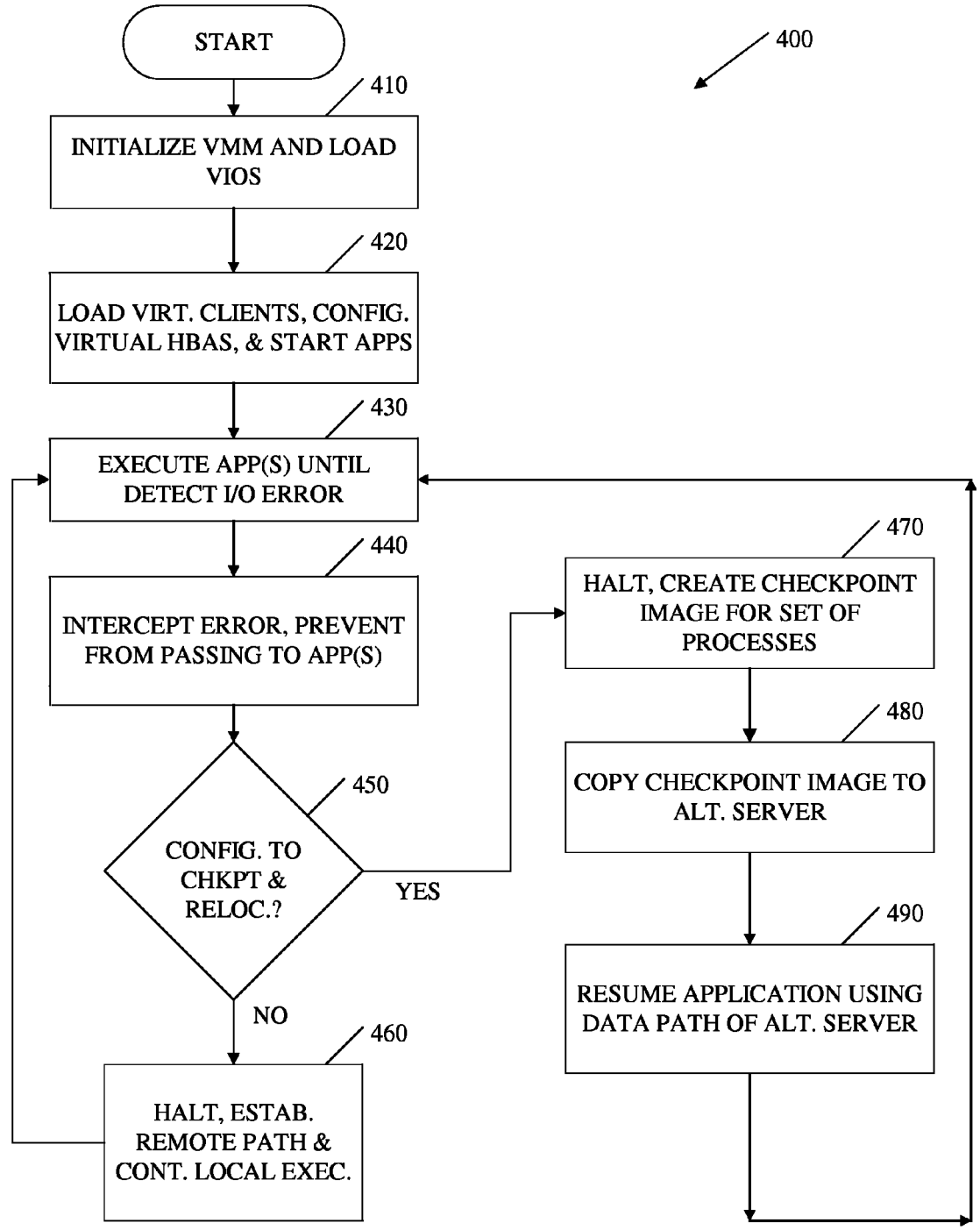
FIG. 4 depicts a flowchart illustrating how a computing device may respond and process an I/O error of an application in accordance with illustrative embodiments.

FIG. 4 depicts a flowchart 400 of a process, illustrating how a computing device may respond and process an I/O error of an application in accordance with illustrative embodiments. For example, one or more embodiments may be implemented as a computer program product comprising one or more computer-readable, tangible storage devices and program instructions, stored on at least one of the one or more storage devices, to halt execution of applications, establish remote connections to data of data storage subsystems, complete I/O requests via the remote paths, and relocate applications for resumption of execution. Alternatively, one or more of the functions of the process depicted in flowchart 400 may be implemented in hardware, such as in a state machine of an application specific integrated circuit.

As illustrated in FIG. 4, the process may involve a computing device, such as a server or an apparatus like apparatus 300, initializing a virtual machine monitor loading virtual I/O servers (element 410). For example with reference to FIG. 1, an embodiment may boot into a virtual computing environment by loading and initializing virtual machine monitor 114. The server may also load and start virtual I/O server 108. Virtual I/O server 108 may reside in an LPAR of the server, wherein virtual I/O server 108 enables numerous MPIO modules within other LPARs of the server to access storage subsystem 138 or other storage devices, such as SATA drive 130.

The server may then load one or more virtual clients, assign virtual HBAs and NICs based on the configuration of various modules, start operating system for the clients, and start applications (element 420). For example, an embodiment may load a Linux® client into node 205 and load an AIX® client into node 230. The server may use the virtual I/O server to dedicate a fibre channel cards for link 260 to MPIO 225, as well as dedicating a NIC to MPIO 225 to enable MPIO 225 to communicate with node 230 via network 240. Node 205 may then enable WPAR 215 and 220 to start executing various applications.

WPARs 215 and 220 may execute applications, processing various I/O requests via MPIO 225 and the local path involving link 260. Execution may continue until MPIO 225 detects an error for an I/O request for all local paths to storage (element 430), whereupon MPIO 225 may intercept the error and prevent notification of the error from being passed back to the originating application (element 440). MPIO 225 may determine the WPAR ID of the I/O request and set an I/O error status flag for the WPAR ID. MPIO 225 may also set the status of paths to local storage, in this scenario only the single path comprising link 260. MPIO 225 may buffer all new incoming I/O of the WPAR internally. Cluster manager 210 may query the status of MPIO 225 and detect the error.

Cluster manager 210 may determine that automatic relocation upon occurrence of an I/O error is not specified (such as in a configuration file) for the resource group to which the WPAR belongs ("No" response of element 450). Cluster manager 210 may determine whether the failed storage is geographically mirrored and only accessible from a server on a remote site, whereupon cluster manager 210 may coordinate a swap of mirror copies to the access storage on the remote site. Alternatively, if the storage device is not accessible from any server belonging to the cluster, cluster manager 210 may select a local storage device for I/O cache and issue a command to freeze the affected WPAR (element 460), if the WPAR has not already been frozen.

Cluster manager 210 may select a target device to submit the I/O to on a remote cluster server and initiate connection establishment. For example, cluster manager 210 may determine that node 230 and MPIO 255 is configured to access the data of SAN 270 for the frozen application via link 275 and SAN switch 280. Cluster manager 210 may signal MPIO 225 to start submitting I/O requests to the path comprising MPIO 255, link 275, and SAN switch 280, which interfaces with the remote storage device of SAN 270.

Cluster manger 210 may determine that relocation should be performed upon occurrence of an I/O error, which may be specified for the resource group to which the WPAR belongs ("Yes" response of element 450). In response, cluster manager 210 may have determined that node 230 is suitable to restart the application and wait for completion of pending I/O via MPIO 255. Cluster manager 210 may quiesce all WPARs of the resource group, if not already quiesced, and create the checkpoint image for the state of the set of processes which constitute the application (element 470).

Cluster manager 210 may terminate the connection for the path of MPIO 225 and MPIO 255 over network 240 and copy the checkpoint image to node 230 (element 480). Cluster manager 235 may configure supporting resources for WPAR 250 to enable the partition to resume execution of the application. Cluster manager 235 may then load the checkpoint image and resume execution of the relocated application via WPAR 250, MPIO 255, and link 275 (element 490).

Flowchart 400 of FIG. 4 illustrates only one process. Alternative embodiments may implement innumerable variations of flowchart 400. For example, some embodiments may halt and relocate single applications. However, many embodiments are not limited to relocating single applications. Alternative embodiment may freeze all applications of a WPAR, create on or more checkpoint images for the entire partition, transfer the images to the target server, and seamlessly resume the execution of all applications in the partition of the takeover server.

For example, an embodiment may freeze all applications of WPARs 215 and 220 and resume all applications of both partitions once the checkpoint images have been relocated to WPARs 245 and 250. Additionally, many embodiments may have multiple local paths and multiple remote paths, instead of the single paths used as examples for the embodiments illustrated.

Further alternative embodiments may involve configurations comprising multiple takeover servers, multiple failover scenarios, and temporary relocations whereupon the applications are relocated to their originating servers once the source of the I/O error(s) has been remedied. For example, MPIO 225 may detect re-establishment of a path to its local storage via link 260. In response, MPIO 225 may set a flag for status of the path. Cluster manager 210 may query the status of MPIO 225 and detect the availability the path to local storage. If a WPAR belonging to a resource group that has not been relocated in response to the error accesses MPIO 225, cluster manager 210 may coordinate several recovery activities based on the connection of MPIO 225. If MPIO 225 maintains a connection to MPIO 255, cluster manager 210 may terminate this connection and return to local submission of I/O requests. If MPIO 225 does not maintain a connection to MPIO 255, in which case incomplete I/O is cached locally, cluster manager 210 may reconstitute I/O requests from cache and resubmit them. Cluster manager 210 may wait for completion of processing of all I/O requests from cache and then resume the applications of the frozen WPAR.

Figure 5:
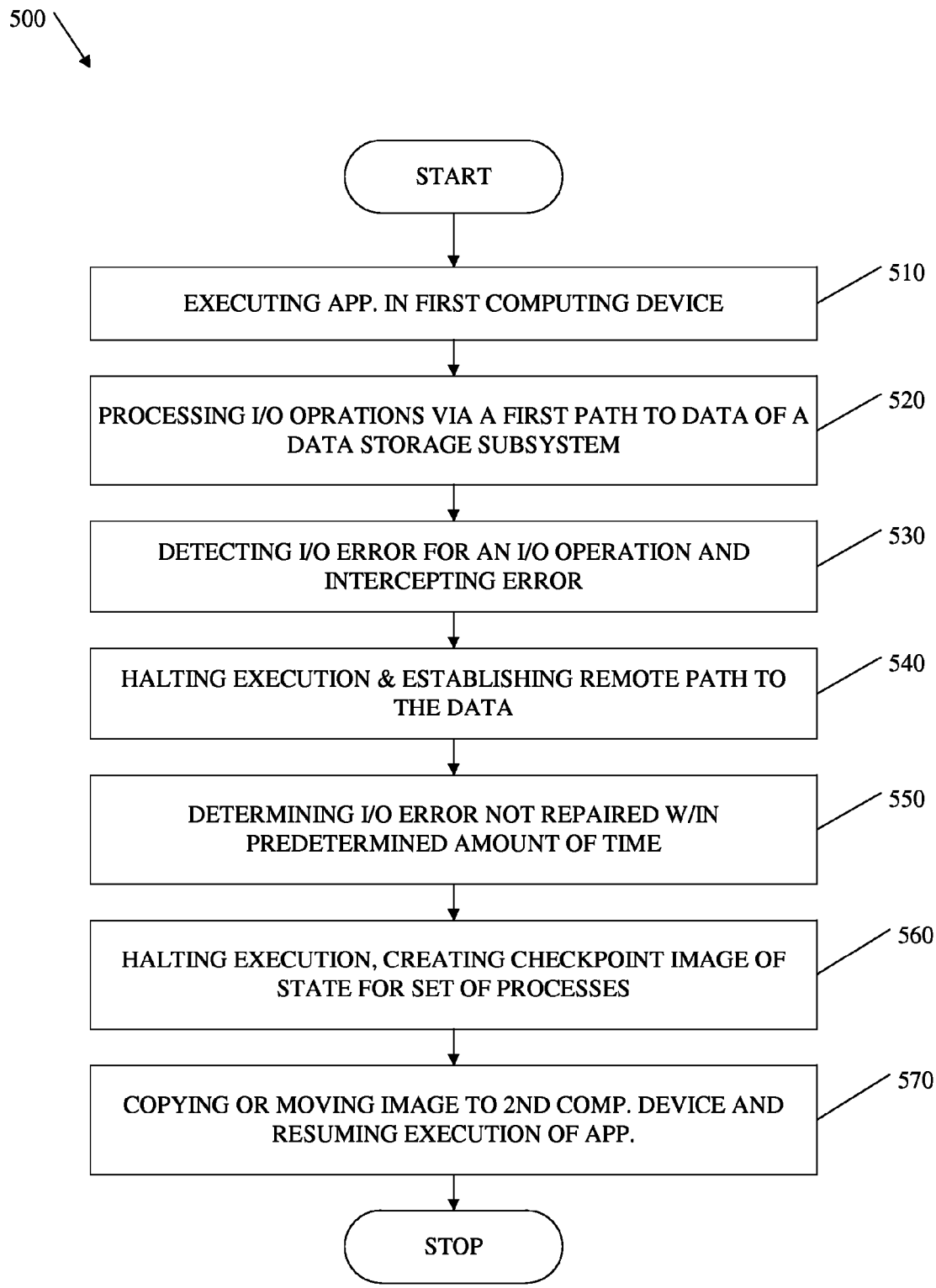
FIG. 5 illustrates a flowchart of a method for processing an application I/O error using local and remote paths to a data storage subsystem in a server environment in accordance with illustrative embodiments.

FIG. 5 illustrates a flowchart 500 of a method for processing an application I/O error using local and remote paths to a data storage subsystem in a server environment in accordance with an illustrative embodiment. For example, an embodiment of apparatus 300 shown in FIG. 3 may comprise a server configured to intercept I/O errors to storage subsystem 370 and process the I/O requests remotely, via apparatus 350. Depending on the operating conditions, apparatus 300 may allow the application to continue executing locally, but use remote I/O access for processing I/O request. Alternatively, apparatus 300 may create a checkpoint image to enable transfer of the affected application(s) to apparatus 350, whereupon application module 355 may enable resumption of the applications without necessarily requiring a restart of the applications.

As application module 310 executes application 315 (element 510), apparatus 300 may process I/O requests for data of application 315 via a local path to storage subsystem 370 (element 520). Error interception module 335 may detect and intercept an I/O error for one of the I/O operations (element 530), preventing the error from causing application 315 from executing code in response to receiving notification of the error. In response to error interception module 335 intercepting the I/O error, apparatus 300 may cause application module 310 to freeze or halt execution of application 315 and establish a remote path to the data in storage subsystem 370 via link 345 and apparatus 350 (element 540).

For example, if overriding constraints exists that prohibit apparatus 300 from relocating application 315 to apparatus 350, a user may decide to keep application 315 running in apparatus 300, accepting a performance penalty due to latencies incurred caused by the remote submission of I/O requests via apparatus 350. Further, apparatus 300 may schedule relocation for another time, or wait until local connectivity to storage subsystem 370 has been restored. Further, if apparatus 350 and no other remote cluster server has access to the data on storage subsystem 370, apparatus 300 may freeze application execution and cache pending I/O request to other local storage, such as internal disks (e.g., SATA hard drive 130). When connectivity to storage subsystem 370 has been re-established, apparatus 300 may resubmit the cached I/O requests to storage subsystem 370 and resume execution of application 315.

Apparatus 300 may be configured to monitor how long local access to storage subsystem 370 remains inaccessible. If apparatus 300 determines that the length of time has passed a preconfigured threshold (element 550), then apparatus 300 may halt the execution, generate the checkpoint of the process set 325 which constitutes application 315 as soon as possible via checkpoint module 340 (element 560). After apparatus 300 remotely completes pending I/O that could not be completed locally due to the I/O error, checkpoint module 340 may transfer the checkpoint image for the set of processes to apparatus 350, where apparatus 350 may in response resume execution of application 315 (element 570).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 4 & 5 may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those skilled in the art, having the benefit of this disclosure, will realize that the present disclosure contemplates handling input/output (I/O) errors for applications in multiple computing device environments. The form of the embodiments shown and described in the detailed description and the drawings should be taken merely as examples. The following claims are intended to be interpreted broadly to embrace all variations of the example embodiments disclosed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for handling an error of an input/output (I/O) operation for an application, the method comprising:
   a computer intercepting the error, wherein the I/O operation is via a first path to a shared storage system of data, wherein the intercepting comprises the computer preventing execution of code of the application in response to the error;
   after said intercepting the error, the computer completing the I/O operation via a second path to the shared storage system;
   after said intercepting the error, the computer creating a checkpoint image of a set of processes that the application comprises, wherein the checkpoint image enables resumption of execution of the code of the application subsequent to completion of the I/O operation via the second path; and
   after said completing the I/O operation via the second path, the computer transferring the created checkpoint image to a second computer to enable the second computer to resume execution of the code of the application via the checkpoint image.

2. The method of claim 1, further comprising: monitoring, by a device driver of the first computer, the I/O operation to detect the error.

3. The method of claim 1, further comprising: the computer halting execution of the application to enable the creating the checkpoint image.

4. The method of claim 3, wherein the computer transferring the checkpoint image comprises transferring data of the checkpoint image via one of a network and a shared memory device, wherein the resumption of execution comprises executing additional I/O operations via a third path to the shared storage system.

5. The method of claim 1, further comprising: the computer caching a request of an additional I/O operation, wherein the computer comprises a server of a first cluster of servers, wherein the second computer comprises a server of a second cluster of servers, wherein the first path comprises a local connection of the server of the first cluster and the second path comprises a local connection of the server of the second cluster.

6. A computer program product comprising one or more computer-readable, tangible storage devices and computer-readable program instructions which are stored on the one or more storage devices and when executed by one or more processors, perform the method of claim 1.

7. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

8. An apparatus, comprising:
input/output (I/O) hardware coupled to a storage device, wherein the I/O hardware enables performance of I/O operations for an application;
an application module to execute the application and generate a state of a set of processes for the application, wherein the application module is configured to perform an I/O operation for the application, wherein the I/O operation is via a first path to data of the storage device;
an error module to intercept an error of the I/O operation and prevent the error from causing the application module to execute code in response to receiving the error, wherein the application module is configured to complete the I/O operation via a second path to data of the storage device in response to the error module intercepting the error;
a checkpoint module to create a checkpoint image of the state in response to completion of the I/O operation via the second path, wherein the checkpoint module is configured to transfer the checkpoint image to a second apparatus, wherein the checkpoint module is configured to create the checkpoint image in a manner which enables the second apparatus to resume execution of the application by starting execution at a point in the application subsequent to the completion of the I/O operation;
a memory module to store instructions of the application module and a processor to execute the instructions;
a first communication device which couples the apparatus to the storage device and enables the transfer of the data for the I/O operation; and
a network link that couples the apparatus to the second apparatus via transport control protocol/Internet protocol (TCP/IP) to enable the transfer of the checkpoint image, wherein the data storage device comprises a component of a storage area network (SAN), wherein the I/O hardware comprises a first physical host bus adapter (HBA) which couples the SAN to the apparatus, wherein the SAN is coupled to the second apparatus via a second physical HBA.

9. The apparatus of claim 8, further comprising a shared memory module, wherein the shared memory module enables the transfer of the checkpoint image to the second apparatus, wherein the storage device comprises a locally connected storage device coupled directly with the apparatus, wherein the second path comprises a second storage device coupled directly with a third apparatus.

10. The apparatus of claim 8, further comprising a multi-path I/O (MPIO) module which enables the application module to transfer data via the network link and enables the application module to transfer data to the SAN via the first path.

11. The apparatus of claim 10, further comprising a management module configured to manage operations of the application module.

12. The apparatus of claim 11, further comprising a virtual machine monitor (VMM) configured to manage execution of the management module, wherein the application module executes in a first partition, wherein the MPIO module comprises a driver module of a kernel, and wherein the MPIO module comprises the error module.

13. A server for processing an error of an input/output (I/O) operation for an application, the server comprising:
one or more processors, one or more computer-readable memories and one or more computer-readable, tangible storage devices;
program instructions, stored on at least one of the one or more storage devices for execution by at least one of the one or more processors via at least one of the one or more memories, to intercept the error, wherein the I/O operation is via a first path from a first computing device to a shared storage system of data;
program instructions, stored on at least one of the one or more storage devices for execution by at least one of the one or more processors via at least one of the one or more memories, to complete the I/O operation via a second path to the shared storage system of data after the error is intercepted;
program instructions, stored on at least one of the one or more storage devices for execution by at least one of the one or more processors via at least one of the one or more memories, to create, after the error is intercepted, a checkpoint image of a set of processes that the application comprises, wherein the program instructions to intercept the error comprise program instructions to prevent a first computing device from executing code of the application in response to the error, wherein the checkpoint image enables resuming execution of the code of the application subsequent to completion of the I/O operation via the second path; and
program instructions, stored on at least one of the one or more storage device for execution by at least one of the one or more processors via at least one of the one or more memories, to transfer, after completion of the I/O operation via the second path, the created checkpoint image to a second computing device to enable the second computing device to resume execution of the code of the application via the checkpoint image.

14. The server of claim 13, further comprising program instructions, stored on at least one of the one or more storage devices for execution by at least one of the one or more processors via at least one of the one or more memories, to process the error of the I/O operation, wherein the program instructions to process the error detect the error via a multi-path input/output (MPIO) module, wherein the MPIO module enables I/O operations between the server and a storage subsystem via a first storage connection and a second storage connection, wherein the second storage connection comprises a connection between a third server and the storage subsystem.

15. The server of claim 14, wherein: the program instructions to process the error of the I/O operation complete the I/O operation and a plurality of other I/O operations via the second storage connection subsequent to detection of the error, wherein the program instructions to process the error of the I/O operation create the checkpoint image in response to completion of the plurality of other I/O operations.

16. The server of claim 13, wherein the application comprises an application of a virtual partition of the server, wherein the checkpoint image comprises an image of a resource group of the virtual partition.

17. A computer program product for handling an error of an input/output (I/O) operation for an application, computer program product comprising:
one or more computer-readable, tangible storage devices;
program instructions, stored on at least one of the one or more storage devices, to intercept the error, wherein the I/O operation is via a first path from a first computing device to a shared storage system of data;
program instructions, stored on at least one of the one or more storage devices, to complete the I/O operation via a second path to the shared storage system of data after the error is intercepted;
program instructions, stored on at least one of the one or more storage devices, to create, after the error is intercepted, a checkpoint image of a set of processes that the application comprises, wherein the program instructions to intercept the error comprise program instructions to prevent a first computing device from executing code of the application in response to the error, wherein the checkpoint image enables resuming execution of the code of the application subsequent to completion of the I/O operation via the second path; and
program instructions, stored on at least one of the one or more storage devices, to transfer, after completion of the I/O operation via the second path, the created checkpoint image to a second computing device to enable the second computing device to resume execution of the code of the application via the checkpoint image.

18. The computer program product of claim 17, further comprising program instructions, stored on at least one of the one or more storage devices, to cache I/O operations of the application to enable completion of the I/O operations via the second path.

19. The computer program product of claim 17, further comprising program instructions, stored on at least one of the one or more storage devices, to complete the I/O operation via the second path prior to the resuming execution, wherein the second path comprises a link between the second computing device and the shared storage system of data.

20. The computer program product of claim 19, further comprising program instructions, stored on at least one of the one or more storage devices, to enable the first computing device to complete I/O operations of the application via a logical partition (LPAR), wherein the LPAR comprises instructions of a multi-path I/O (MPIO) module, wherein the instructions of the MPIO module enable the application to complete I/O operations of the application via the first path and a third path, wherein the third path comprises a link between a third computing device and the shared storage system of data.

* * * * *